United States Patent [19]

Dreiseitl et al.

[11] 4,450,403

[45] May 22, 1984

[54] METHOD AND APPARATUS FOR DETERMINING ROTATIONAL SPEED

[75] Inventors: Walter Dreiseitl, Erlangen; Manfred Koch, Bamberg; Wilhelm Linden, Erlangen-Buechenbach, all of Fed. Rep. of Germany

[73] Assignee: Siemens AG, Berlin and Munich, Fed. Rep. of Germany

[21] Appl. No.: 348,833

[22] Filed: Feb. 16, 1982

[30] Foreign Application Priority Data

Mar. 2, 1981 [DE] Fed. Rep. of Germany ....... 3107938

[51] Int. Cl.$^3$ .......................... G01P 3/48; G01P 3/54
[52] U.S. Cl. ..................................... 324/166; 324/165
[58] Field of Search ............. 324/166, 165, 167, 78 R, 324/78 D, 163; 307/228; 328/14, 181

[56] References Cited

U.S. PATENT DOCUMENTS 4,228,396 10/1980 Palombo ........................ 324/165 X

FOREIGN PATENT DOCUMENTS

| 1298297 | 6/1969 | Fed. Rep. of Germany ...... 324/165 |
| 1962531 | 6/1971 | Fed. Rep. of Germany ... 324/78 D |
| 120953 | 9/1981 | Japan .................................. 324/166 |
| 2020929 | 11/1979 | United Kingdom ............. 324/78 D |
| 2082857 | 3/1982 | United Kingdom ............. 324/78 R |

Primary Examiner—Stanley T. Krawczewicz
Assistant Examiner—Jose M. Solis
Attorney, Agent, or Firm—Karl F. Milde, Jr.; Andrew G. Rodau

[57] ABSTRACT

A method and apparatus are disclosed for providing improved rotational speed determination for a rotating shaft. Two probes positioned adjacent a circular disk which rotates with the shaft scan markings on the disk and generate four out-of-phase signals in response to rotation of the shaft. A switch, controlled by logic circuitry which detects intersections of the signals, develops a composite saw-tooth-shaped signal from the four signals. A counter counts the number of crossings of the composite signal with a reference "zero" value to develop a determination of the number of discrete angular positions traversed by the shaft during a specified time interval. A memory stores the value of the composite signal at the start of the time interval. Computation circuitry develops a rotational speed based on the counted number of positions, corrected by a factor derived from the difference between the stored value and the value of the composite signal at the end of the interval. Time control circuitry prevents the start or end of the time interval during switching and prevents switching during the start or end of the time interval.

9 Claims, 8 Drawing Figures

FIG 1

$$\left(n + \frac{\phi_f - \phi_s}{\phi_0''}\right)/T$$

METHOD AND APPARATUS FOR DETERMINING ROTATIONAL SPEED

BACKGROUND OF THE INVENTION

1. Field of the Invention

This invention relates to a method and apparatus for determining the rotational speed of a rotating member, such as a rotary shaft.

2. Description of the Prior Art

Both analog and digital techniques exist for determining the rotational speed of a rotary shaft, such as the shaft of a speed-regulated machine.

Analog rotational speed determination is most often done using a tachogenerator, the electrical output signal of which is only approximately linearly dependent on the rotational speed of the shaft. The output signal is affected by fluctuations caused, for example, by the lamination or the potentials at the carbon contacts. At low rotational speeds, these fluctuations mask the approximately speed-proportional component of the output signal in such a way that exact speed determination is not possible. In addition, there is a reversing error and a long-term drift, caused, for example, by the temperature response of the generator and which also exists at high speeds of rotation.

Digital rotational speed determination is done using an incremental tachometer. Such a device typically comprises a pulse-generating disk mounted for rotation with the shaft. Marks are provided spaced at equidistant discrete angular positions on the periphery of the disk and a stationary probe is positioned adjacent the disk to scan the marks as the disk rotates with the shaft. The marks may be magnetic marks scanned by Hall-effect probes or optical marks scanned by optical sensors.

A periodic electrical signal is generated when the marks rotate past the probe. The probe produces one cycle of the periodic signal in response to the detection of each mark. The number of marks which rotate past the probe (i.e. the number of discrete angular positions traversed as detected from the electrical signal) during a specified time interval determines the rotational speed of the shaft.

The output signal of the probe, as a function of the angle of rotation, is a continuous periodic analog signal which varies steadily between two extreme values. One extreme value corresponds to an angular position of the disk for which the probe is aligned directly opposite one of the marks. The other extreme value corresponds to a disk position for which the probe is opposite a point on the disk periphery which is centered between two marks. The signal generated by the probe is generally sinusoidal or triangular in shape. The number of marks rotating past the probe can be determined by detecting the number of occurrences of a particular event in the probe output signal. This can be done using a threshold detector or comparator to determine the intersection of the output signal with a fixed reference signal. The number of intersections detected during a specified measurement period corresponds to the number of marks that have moved past the probe, i.e. the number of discrete angular positions which lie within the total angular displacement traversed during the measurement period. The total angular displacement of the shaft is equal to the product of this number and the angular increment between marks. For a fixed measurement time period, the rotational speed is thus directly proportional to the number of discrete angular increments swept.

Determination of the rotational speed in a digital manner by counting the integral number of discrete angular positions traversed by the shaft during a specified time period is relatively accurate only if during this period the shaft rotates through a sufficiently large number of discrete angular increments, i.e. for high speeds or long measurement times. For rotational speed determinations at either low speeds or short measurement times, for which total angular rotation of the shaft cannot be accurately approximated by rotation through an integral number of discrete angular increments, such a measurement technique is unsatisfactory.

For this reason some conventional devices combine the analog and digital techniques, by coupling to the rotary shaft both an analog tachogenerator and a digital tachometer, and using the output signal of the digital tachometer to correct the analog rotational speed determination. This duplication of instrumentation is, however, costly. Further, for mechanical and operational safety reasons, the use of an analog tachogenerator may be undesirable in many applications. Notwithstanding this, exact determination of low rotational speeds is still not possible. Moreover, such combination devices cannot determine a zero rotational speed, such as occurs during machine standstill or upon reversal of the direction of rotation.

SUMMARY OF THE INVENTION

It is an object of this invention to provide a low cost method and apparatus for accurately determining the rotational speed of a rotating member, such as a rotary shaft, even at low speeds down to standstill.

The method of the invention provides a more accurate rotational speed determination by modifying the digital speed determination obtained using conventional digital tachometer techniques using a correction factor determined from instantaneous values at the beginning and end of a measurement time inverval of a steadily varying electrical signal periodically generated in response to the rotation of the shaft or other rotating member through successive discrete angular increments.

In accordance with the apparatus of the invention, a signal generator is provided for generating a steadily varying electrical signal periodically in response to the rotation of the shaft through successive discrete angular positions. A counter serves to count the number of occurrences within a specified time interval of a particular event in the signal. In addition, correction circuitry is provided to define a correction factor based on the respective instantaneous values of the signal at the beginning and end of the time interval and to compute a value for the rotational speed based on the number of occurrences counted, as modified by the correction factor defined for the time interval.

As described in greater detail below, in a preferred embodiment of the invention the apparatus includes a memory for storing the instantaneous value at the beginning of the measurement time interval of the generated angular signal. The correction circuitry comprises computation circuitry for calculating the difference between the stored beginning instantaneous value and the instantaneous value at the end of the measurement time interval of the angular signal, for defining a correction factor based on this difference, and for computing the rotational speed based on the sum of the calculated correction factor and the number of counted discrete angular increments.

The preferred embodiment is implemented by augmenting the standard elements of a conventional digital tachometer which produces a steadily varying periodic signal, with instantaneous value storage means and digital speed determination correction circuitry. The conventionally established digital speed determination is modified by the correction factor to give a more accurate value.

The advantages of the invention can be realized by augmenting various types of known digital tachometers in like manner, since in general such devices use optical or magnetic probes which initially produce a signal in response to angular displacement which is approximately sinusoidal or triangular in shape.

There have thus been outlined rather broadly the more important objects, features and advantages of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including such equivalent arrangements as do not depart from the spirit and scope of the invention.

BRIEF DESCRIPTION OF THE DRAWINGS

An embodiment of apparatus has been chosen for purposes of illustration and description of the method and apparatus of the invention, and is shown in the accompanying drawings forming a part of the specification, wherein.

Throughout the drawings, like reference numerals represent like elements.

DETAILED DESCRIPTION OF THE PREFERRED EMBODIMENT

Figure 1:
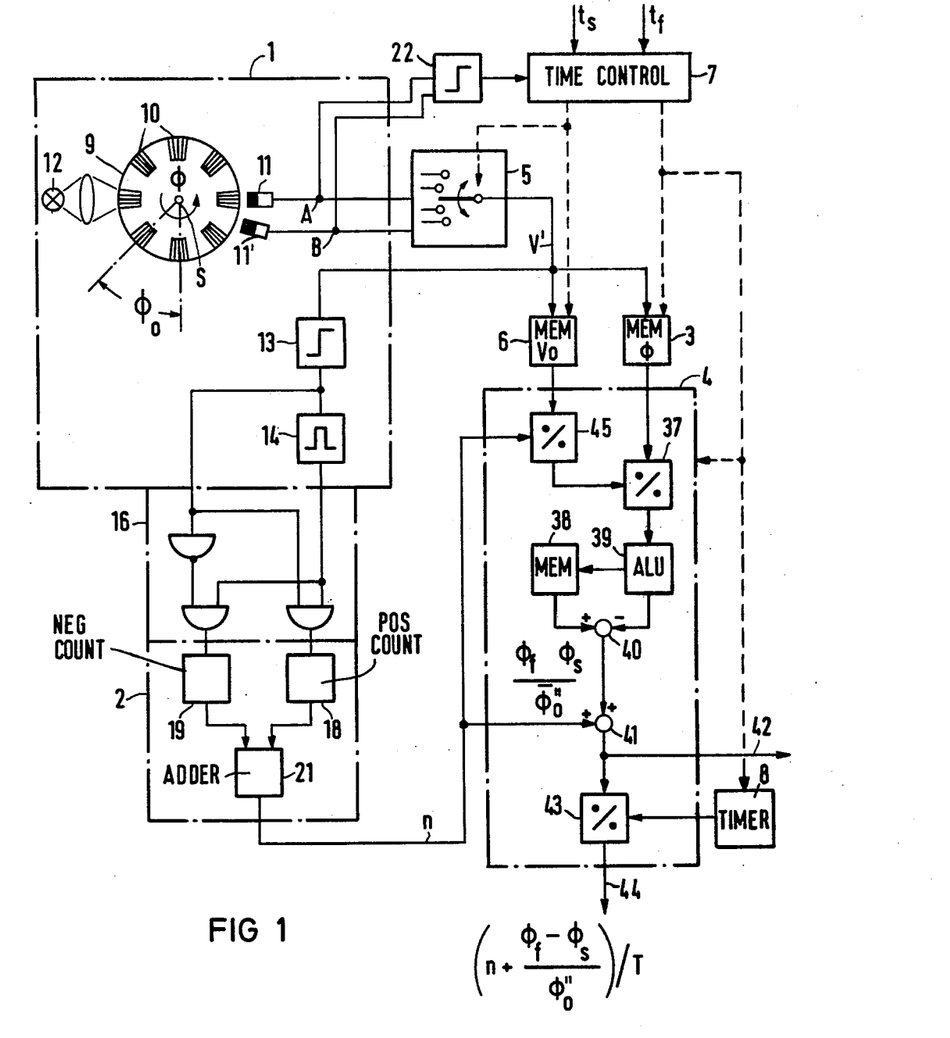
FIG. 1 is a block diagram of apparatus according to the invention.

As shown in FIG. 1, an embodiment of a rotational speed determination apparatus in accordance with the invention comprises a signal generator 1 for generating a periodic electrical signal as a function of the angular rotation of a rotary shaft S, a counter 2 for counting the number n of incremental angular displacements $\phi_o$ traversed by the shaft S as determined from analysis of the signal within a specified measurement time interval T, a memory 3 for storing the instantaneous value of the signal at the start time $t_s$ of the time interval T and correction circuitry 4 for defining a correction factor based on the difference between the instantaneous value of the signal at the finish time $t_f$ of the time interval T and the stored value of the signal at the start time $t_s$, and for computing a value for the rotational speed of the shaft based on this correction factor and the number n.

The device, as shown in FIG. 1, also includes a switch 5, a second memory 6, a time control unit 7 and a timer 8, all of which are described more fully below.

The elements of the device for producing the number n of incremental angular displacements $\phi_o$ traversed by the shaft S within a specified time interval T are structured according to well-known digital tachometer techniques. A circular disk 9, having N markings 10 spaced equidistantly about its periphery, is mounted for rotation coaxially with the shaft S. The markings 10 are arranged at discrete angular positions about the disk 9, with an angular displacement of $\phi_o$ between adjacent markings. A probe 11 is mounted in a fixed position adjacent the periphery of the disk 9 for scanning the markings 10 as the disk 9 rotates with the shaft. The markings 10 shown in FIG. 1 take the form of light transmitting windows on the disk 9 and the probe 11 takes the form of an optical sensor. As the windows 10 successively pass before the probe 11, light from a light source 12 mounted in a fixed position on the opposite side of the disk 9 is detected by the optical sensor probe 11, and a steadily varying electrical output signal is generated periodically in response to the rotation of the shaft S through successive discrete angular increments $\phi_o$. The signal generated at a point "A" shown in FIG. 1 takes the form of the signal "A" shown in FIG. 2A.

Those skilled in the art will appreciate that although the embodiment illustrated in FIG. 1 utilizes light transmitting markings 10 and an optical sensor probe 11, another marking and probe configuration (such as magnetic markings and Hall effect probe) that generates a steadily varying periodic output signal with the rotation of the shaft S is likewise usable. For the illustrated configuration, the output signal "A" (FIG. 2A) is a photoelectric signal whose voltage V varies sinusoidally as a function of the angular displacement $\phi$ of the shaft S. The period of the signal "A" is determined by the number of markings 10 spaced about the periphery of the disk 9. For N markings 10 spaced at angular intervals $\phi_o$ about the disk 9, the signal "A" will have a cycle of $2\pi/N$. A digital determination of rotational speed can be achieved by counting the number of occurrences of a particular periodic signal event within the specified time interval T. The amplitude of signal "A" (FIG. 2A) varies steadily in a periodic fashion in accordance with the amount of light reaching the probe 11 from the light source 12. "Zero crossings" for the signal "A" may be defined as occurring whenever the markings 10 of the disk 9 are positioned with respect to the light path between the probe 11 and the light source 12 so that the probe 11 receives one-half of the maximum light intensity. The number of occurrences of such "zero crossings" within a specified time interval T can be used to obtain a digital determination of rotational speed for the shaft S.

These crossings occur at angular intervals of $\pi/N$ radians (i.e. $\pi/N$, $2\pi/N$, $3\pi/N$, etc.) and may be detected using conventional circuitry, such as a threshold detector 13 (FIG. 1) and a pulse former 14 which provides pulses for counting to the counter 2. For "zero crossing" detection a smoothing circuit (now shown) connected to the point A may be used which produces the average of the signal "A" as threshold value for the detector 13.

By way of example, for a specified measurement time interval T, consider the disk 9 to be at an angular position (FIG. 2A) which is just before a zero crossing of the signal "A" ($2\pi/N$ in FIG. 2A) at the start time $t_s$ of the time interval T and at an angular position which is just after a zero crossing ($3\pi/N$ in FIG. 2A) at the finish time $t_f$. The total angular displacement during the time interval is thus just slightly greater than $\pi/N$ (i.e. $3\pi/N - 2\pi/N$), corresponding to an actual rotational speed of just over $(2\pi \text{ rads})/(N \cdot T) = (1 \text{ rev})/(2 \cdot N \cdot T)$. The digital determination of the speed calculated from the product of the number (n=2) of zero crossings counted by the counter 2 and the discrete angular displacement $\pi/N$ between zero crossings, will be $(2\pi \text{ rads})/(N \cdot T) = (1 \text{ rev})/(N \cdot T)$. This shows that the speed determination at low speeds using conventional digital techniques is inaccurate. As described more fully below, the formulation of a correction factor in accordance with this invention provides a much more accurate, corrected digital determination of rotational speed.

Use of a single probe 11 is sufficient for determining rotational speeds in cases where the shaft S rotates in a single direction (clockwise or counterclockwise) only. For speed determination where the shaft S rotates in both directions (clockwise and counterclockwise), in accordance with conventional digital tachometer teachings a second probe 11' (see FIG. 1) is mounted in a fixed position adjacent the disk 9 so as to generate at a point B in FIG. 1 a second signal "B" (shown in FIG. 2A) which is phase-shifted 90° relative to signal "A". When the direction of rotation of the shaft S is in the direction of the arrow shown on the disk 9 in FIG. 1, the signal "B" precedes the signal "A" and rotation is designated as being in the positive direction. In such case, the value of the signal "B" will be positive at positive-going zero-crossing points of the signal "A" (see, e.g., $\pi/N$ in FIG. 2A). When shaft rotation is in the opposite direction, the signal "B" lags the signal "A" and rotation is designated as being in the negative direction. For negative rotation (not shown in FIG. 2A), signal "B" will have a negative value at positive-going zero-crossing points of signal "A". A direction discriminator 16 (FIG. 1) may thus be used to determine the direction of rotation.

The direction discriminator 16 is configured in a conventional manner, such as described for example in "Die numerische Steuerung von Werkzeugmaschinen", Munich 1971, FIG. 13. The counter 2 comprises a positive-direction pulse counter 18 and a negative-direction pulse counter 19 which are connected respectively to receive the positive-direction and negative-direction outputs of the direction discriminator 16. For every discrete angular position $\phi_o' = \frac{1}{2}\phi_o$ traversed by the shaft S (and thus the disk 9) in the positive direction of rotation, a corresponding zero-crossing pulse signal is delivered from the pulse former 14 to the positive-direction pulse counter 18. Likewise, for every discrete angular position $\phi_o'$ traversed in the negative direction, a zero-crossing pulse signal is delivered to the negative-direction pulse counter 19. An adder 21 is connected to provide a digital signal n at the end of the measurement period T which is the difference between the number of positive pulses $n_p$ recorded by the counter 18 and the number of negative pulses $n_n$ recorded by the counter 19 during the time interval T. For different measurements taken at a constant time interval T, the signal n will be approximately proportional to the different speeds of rotation (i.e. uncorrected digital determination of such speeds).

In accordance with the invention, the digital determination of the rotational speed based upon the net discrete angular displacement count n at the adder 21 is modified to better account for inaccuracy in approximating the actual total angular rotation $\phi$ by a counted digital number of discrete increments $\phi_o'$. This inaccuracy is primarily due to failure to consider those portions of the angular rotation that occur before the first occurrence and after the last occurrence of the counted signal events. First, circuitry is provided to manipulate the output signals "A" and "B" of the probes 11 and 11' so as to provide a steadily varying periodic signal having a greater number of zero-crossing points and for which the angular signal varies in almost uniform linear fashion as a function of $\phi$ between zero-crossing points. Second, correction circuitry is provided to modify the digital speed determination based on the net count n by means of a correction factor $\Delta\phi$ derived from the instantaneous values of the angular signal at the start time $t_s$ and finish time $t_f$ of a specified measurement time interval T.

A more precise initial digital determination of the rotational speed is obtainable by increasing the number of signal events corresponding to discrete angular incremental displacements of the shaft S that can be counted. In the preferred embodiment, the output signals of the probes 11 and 11' are manipulated to accomplish this by a switch control circuit 22 which is used to control the switch 5 (see FIGS. 1 and 3) to provide an angular-rotation-dependent signal V' having the form shown in FIG. 2C. Inverters 23 and 24 are connected to the probes 11 and 11' to provide the additional signals "$\overline{A}$" and "$\overline{B}$" (shown in dot-and-dash in FIG. 2A) which are respectively the inverted versions of the signals "A" and "B", discussed above. A comparator circuit 25 is connected to compare the values of the signals "A" and "B" to develop a control signal $V_a = f(\phi)$ having the form shown in FIG. 2B, which is "high" whenever the value of signal "B" is greater than the value of signal "A". another comparator circuit 26 is connected to compare the signals "$\overline{A}$" and "B" to develop a control signal $V_b = f(\phi)$ having the form shown in FIG. 2B which is high whenever the value of signal "B" is greater than the value of signal "$\overline{A}$".

TABLE 1

| CONDITION | SWITCH STATES | | | | ANGULAR SIGNAL |
|---|---|---|---|---|---|
| | 33 | 34 | 35 | 36 | |
| B > A and B > $\overline{A}$ | closed | open | open | open | V' = $\underline{A}$ |
| B < A and B < $\overline{A}$ | open | closed | open | open | V' = A |
| B > A and B < $\overline{A}$ | open | open | closed | open | V' = $\underline{B}$ |
| B < A and B < A | open | open | open | closed | V' = B |

Figure 2C:
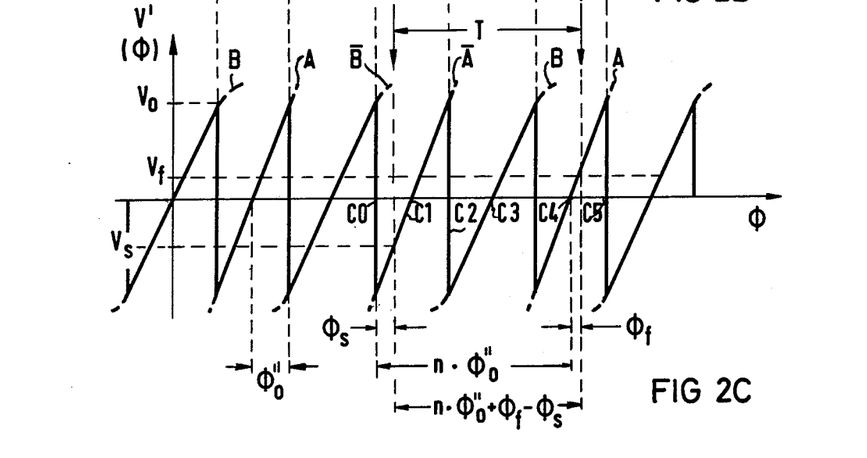
Figure 3:
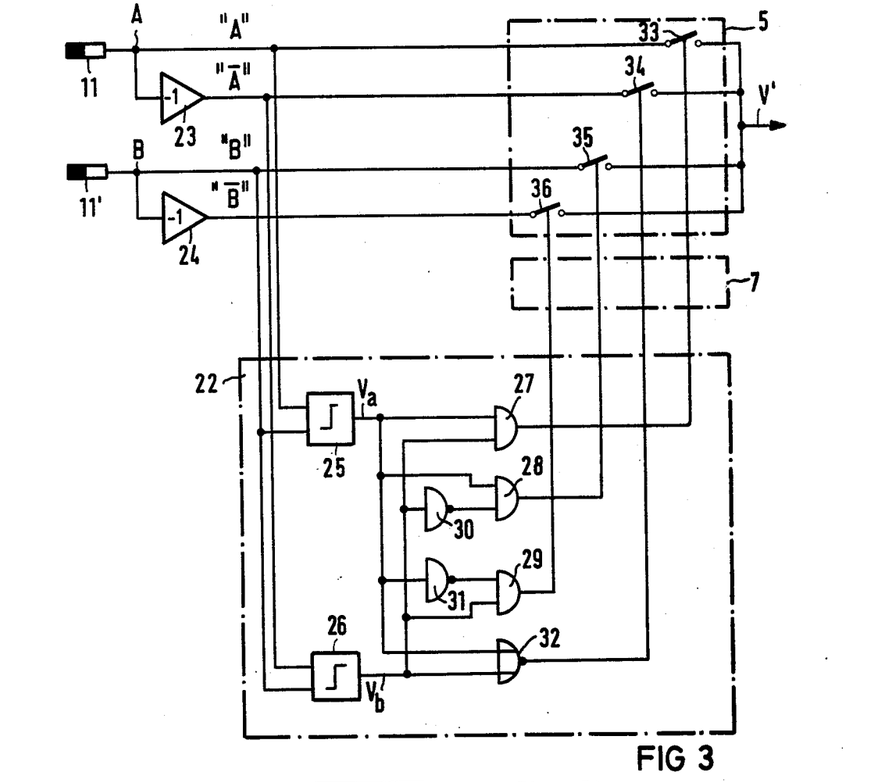
FIG. 3 is a schematic diagram of a portion of FIG. 1.

The outputs of the comparators 25 and 26 are connected as inputs to a logic circuit comprising AND-gates 27, 28, 29, inverters 30, 31 and a NOR-gate 32 as indicated in FIG. 3. The outputs of this logic circuit are connected to control the switches 33, 34, 35 and 36 of the switching network 5 in the manner given in Table 1, so as to generate an output signal $V' = f(\phi)$ having the sawtooth waveform shown in FIG. 2C. The operation of the logic components of the control circuit 22 is such that the signal V' takes the form of a repetitive sequence of the respective rising branches of the signals "B", "A", "$\overline{B}$" and "$\overline{A}$" for positive rotation of S. Transmission of the control signals from the logic components of the control circuit 22 to the switch network 5 is through the time control element 7, which is described below.

Figure 2A:
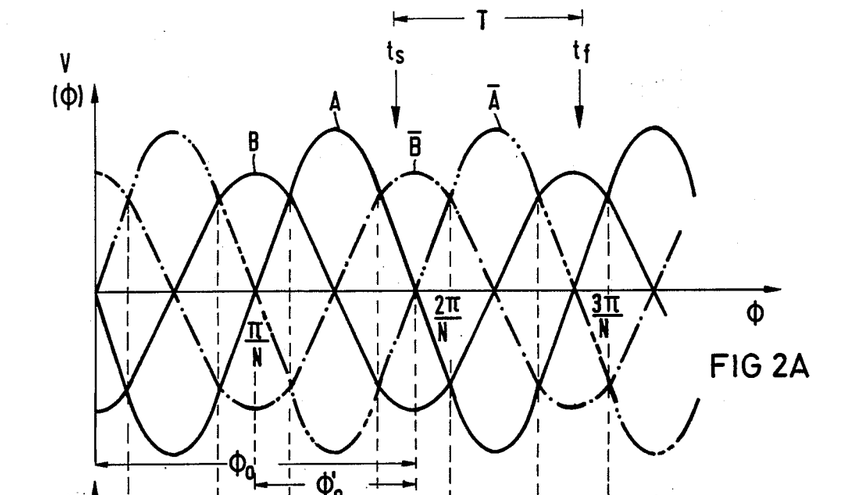
FIGS. 2A-2C are diagrams of signals occurring in the apparatus of FIG. 1.
Figure 2B:
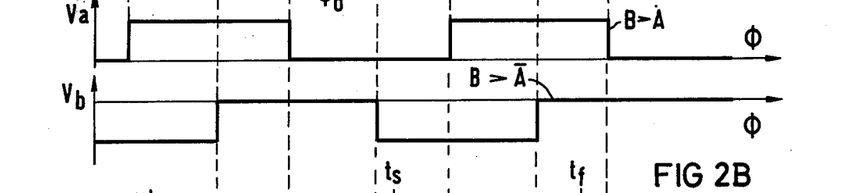

As shown in FIG. 2C, the signal V' has a greater number of zero crossings than the signal "A" shown in FIG. 2A. Thus, the number of signal event occurrences which can be counted (and which correspond to discrete angular rotation positions of the shaft S) has been increased to provide increased digital rotational speed resolution. The angular increment of the shaft S corresponding to one zero crossing has been reduced to $\phi_o'' = \pi/4N$.

For the example time interval T given in FIG. 2C, defined by a start time $t_s$ and a finish time $t_f$, the number of zero crossings counted by the counter 2 for the switch network 5 output signal V' will be n=5 (i.e. zero-crossings $C_1$, $C_2$, $C_3$, $C_4$ and $C_5$ in FIG. 2C). The digital approximation of the speed will therefore be $n \cdot \phi_o''/T = (5\pi \text{ rads.})(4 N \cdot T)$ or $(5 \text{ revs.})/(8 N \cdot T)$, which is a closer approximation than the digital speed determination of $(1 \text{ rev.})/(N \cdot T)$ made above using the straight angular signal "A".

In accordance with the invention, accuracy is further improved by introducing a correction factor defined from the instantaneous values of the signal V' at the start time $t_s$ and finish time $t_f$ of the time interval T. To do this, in addition to feeding the output V' of the switch network 5 to the zero-crossing detector 13, it is also fed as an input to the memory 3 and the memory 6 (FIG. 1).

The rising branches of the sawtooth signal V' (FIG. 2C) are more or less linear and the angular displacement between zero-crossing points is $\pi/4N$. The angular displacement $\phi_s$ of the shaft S between the shaft position at the start time $t_s$ of the time interval T and the shaft position at the last zero-crossing point before time $t_s$ (point $C_0$ in FIG. 2C) is therefore directly related to the instantaneous value of the angular signal V' at the time $t_s$. Likewise, the angular displacement $\phi_f$ of the shaft S between the shaft position at the last counted zero-crossing point (point $C_5$ in FIG. 2C) and the shaft position at the finish time $t_f$ is directly related to the instantaneous value of V' at the time $t_f$. A much more accurate rotational speed determination is made possible by modifying the digital speed determination based on the counted zero-crossings with a correction factor taking into account the angular displacements $\phi_s$ and $\phi_f$, as follows:

$$\phi = n \cdot \phi_o'' + \phi_f - \phi_s = \left( n + \frac{(\phi_f - \phi_s)}{\phi_o''} \right) \cdot \phi_o''$$

where $\phi$ = total angular displacement of the shaft S during the time interval T;
$\phi_o''$ = mean angular displacement between counted signal V' events (i.e. zero crossings);
$n$ = number of events (i.e. zero crossings) counted within the time interval T;
$\phi_s$ = angular displacement between the zero crossing just prior to time $t_s$ and the position at time $t_s$; and
$\phi_f$ = angular displacement between the zero crossing just prior to time $t_f$ and the position at time $t_f$.

Since the rising portions of the signal V' are linear, the angular displacements $\phi_s$ and $\phi_f$ can be expressed in terms of the instantaneous values $V_s$ and $V_f$ of V' at the times $t_s$ and $t_f$, respectively, as follows:

$$\phi_s = (V_s/V_o) \cdot \phi_o'' \text{ and } \phi_f = (V_f/V_o) \cdot \phi_o''$$

where $V_o$ = maximum amplitude of the signal V';
$V_s$ = instantaneous value at time $t_s$ of the signal V' above its value at the last preceding zero crossing point;
$V_f$ = instantaneous value at time $t_f$ of the signal V' above its value at the last preceding zero crossing point; and
$\phi_o''$ = mean angular displacement between counted V' signal events (i.e. zero crossings)

The output V' of the switching network 5 is connected as an input to the memory 3 (see FIG. 1) which is controlled by the time control unit 7 to store the instantaneous value $V_s$ at the start time $t_s$ of the measurement time T and the instantaneous value $V_f$ of the finish time $t_f$. The stored value $V_f$ of one measurement period can be used as the value $U_s$ of a subsequent measurement period, if desired. The output of the switching network 5 is also connected as an input to the second memory 6 which is controlled by the time control unit 7 so that the maximum amplitude $V_o$ of the output signal V' is stored when the switching network 5 is switched. At the end of the measurement period T, the value $V_s$ stored in the memory 3 is divided in a divider circuit 37 by the value $V_o$ stored in the memory 6 (see FIG. 1). The value $V_s/V_o$ is then stored in a memory unit 38 via an arithmetic unit 39. The value $V_f$ at the end of the time period is also divided by $V_o$ in the divider 37 and transferred to the arithmetic unit 39. An adder 40 is connected to receive the values $V_s/V_o$ from the memory 38 and the arithmetic unit 39 and to develop the correction factor $$\Delta\phi/\phi_o'' = (\phi_f - \phi_s)/\phi_o'' = (V_f - V_s)/V_o$$

An adder 41 is connected to receive the correction factor from the adder 40 and the value n of increments $\phi_o'$ counted during the measurement time interval T and to develop the factor $n + (\phi_f - \phi_s)/\phi_o''$. For constant measurement intervals T, the factor developed by the adder 40 is proportional to the rotational speed of the shaft S and may be read out of the device at an output terminal 42.

It is advantageous, however, to be able to adopt the internal T to the particular measuring requirements. To accomplish this, a divider 43 is connected to divide the corrected signal obtained at the adder 41 by the length T of the measurement period which is received from the timer 8. The timer 8 may take the form of a conventional constant frequency pulse counter which is connected so that its setting and readout are controlled by the time control unit 7. The counter 8 is initialized at the start time $t_s$ and the time interval T is determined by the counter reading at the finish time $t_f$.

The signal shapes (i.e. maximum amplitudes) of the signals A and B developed from the probes 11 and 11' (FIG. 1) may be different (such as due to inaccurate adjustment, etc.). This is shown greatly exaggerated in FIG. 2A. Consequently, the amplitudes $V_o$ at the peaks of the sawtooth signal V' (shown in FIG. 2C) may fluctuate. The maximum amplitude $V_o$ of the signal V' is moreover subject to variation due to temperature response and aging. It is thus advantageous to develop a mean value $\overline{V}_o$ of the signal V' corresponding to the mean angular displacement $\phi_o''$ during the measurement interval T and to use this value for normalizing the difference factor $(\phi_f - \phi_s)\phi_o''$, or the corresponding factor $(V_f - V_s)/V_o$. This is done by reading the value $V_o$ of the signal V' at each actuation of the switching network 5 and adding the successive $V_o$ values in the memory 6

(summation memory), which is reset to zero by the next start time $t_s$. A divider 45 is connected to divide the accumulated sum of the $V_o$ values stored in the memory 6 by the number of switch actuations during the interval T determined from the number n of counted zero crossings.

This provides a normalized correction factor $(\phi_f-\phi_s)/\phi_o'' = (V_2-V_1)/\overline{V}_o$ at the adder 40. The calculated value $\overline{V}_o$ may be stored in the divider 45 until the counter 2 delivers the next number $n \neq 0$ for a succeeding measurement interval. Therefore, for determination of rotational speeds near standstill, for which n=0, the value $\overline{V}_o$ is determined for values of n and the memory 6 stored from the preceding measurement period.

In operation of the device, at the start time $t_s$ of a measurement time interval T, the counter 2 and the timer 8 are initialized and the memory 3 is enabled to record the instantaneous value $V_s$ of the angular signal V'. Thereafter, throughout the measurement interval, the control signals developed by the switch control circuit 22 (FIG. 3) sequentially actuate the switches 33–36 of the switching network 5 to generate the sawtooth signal V' of FIG. 2C and activate the memory 6 to develop a sum of the peak amplitudes $V_o$ of the generated sawtooth signal. At the finish time $t_f$ of the measurement period T, the instantaneous values $V_s$ and $V_f$ of the signal V' at the start time $t_s$ and the finish time $t_f$, and the sum of the $V_o$ values are delivered from the memories 3 and 6, respectively, to the correction circuitry 4 which develops the correction factor $(\phi_f-\phi_s)/\phi_o''$ $(=(V_f-V_s)/\overline{V}_o)$ for adding to the digital speed determination n. This sum is then divided by the length of the time interval T specified by the timer 8 and a determination of rotational speed $\phi/T$ is made. Time control is provided by the time control unit 7 whose structure and operation can be understood by reference to FIGS. 4A, 4B and 5.

As shown in FIG. 2C, the digital determination of rotational speed $n \cdot \phi_o''$ is determined by counting the zero-crossing points $C_1$, $C_2$, $C_3$, $C_4$ and $C_5$ which represents rotation of the shaft S through the rotational increments $C_0$ to $C_1$, $C_1$ to $C_2$, $C_2$ to $C_3$, $C_3$ to $C_4$ and $C_4$ to $C_5$. The first counted increment $C_0$ to $C_1$, however, includes an initial rotational displacement from the shaft position at $C_0$ to the shaft position at the start time $t_s$ of the measurement interval T (denoted $\phi_s$ in FIG. 2C) which is not part of the total angular displacement $\phi$ during the measurement period. Further, the last counted increment $C_4$ to $C_5$ ends before the final displacement from the shaft position at $C_5$ to the shaft position at the finish time $t_f$ of the measurement interval T (denoted $\phi_f$ in FIG. 2C) which is part of the total angular displacement $\phi$. Accordingly, the actual total displacement $\phi$ during the time interval T is given by:

$$n \cdot \phi_o'' + \phi_f - \phi_s$$

Figure 4A:
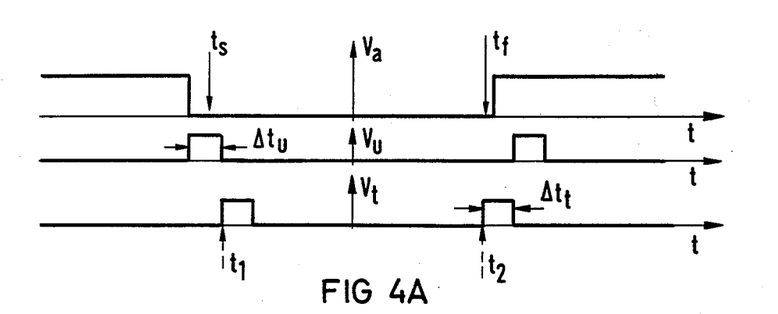
FIGS. 4A and 4B are diagrams of signals occurring in an operational example using the apparatus of FIG. 1.
Figure 4B:
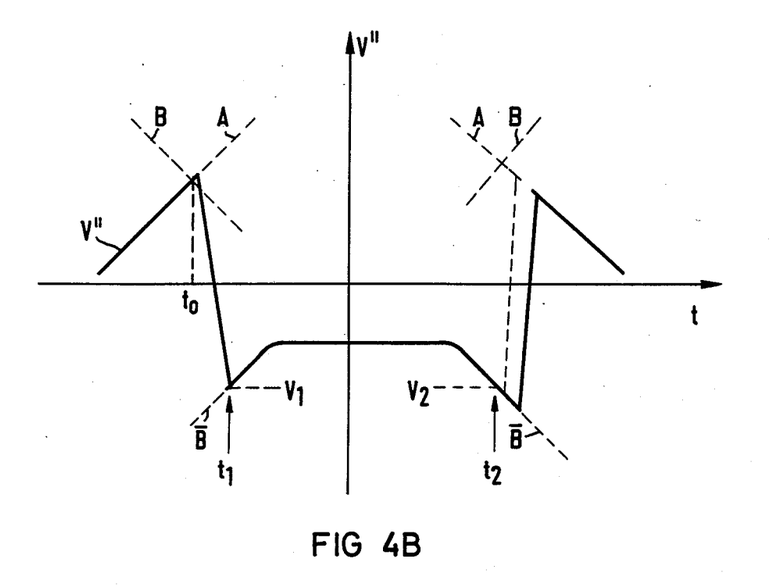
Figure 5:
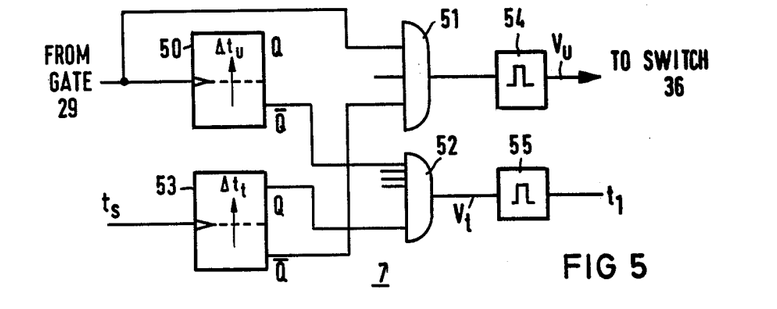
FIG. 5 is a schematic diagram of a further portion of FIG. 1.

FIG. 4B illustrates a sawtooth signal V' of an operational example in which the rotary shaft S experiences a momentary standstill upon reversal of its direction of rotation. At the onset, prior to a time $t_o$, the shaft rotates at a constant positive angular direction of rotation and the signal V' follows the rising portion of the signal A in a manner as explained above in reference to FIGS. 2A and 2C. At time $t_o$ the signals A and B (see FIGS. 2A and 4B) intersect, causing a change in state of the signal $V_a$ (FIG. 4A) developed by the comparator 25 (FIG. 3, discussed above). This change in state operates the switching network 5 so that the signal V' shifts to follow the rising portion of the signal $\overline{B}$ at a time $t_1$. The rotation then continues in a positive direction, until the shaft comes to a standstill and then proceeds in a reverse direction, the signal V' now following the falling portion of the signal $\overline{B}$ (for reverse direction). Approximately at a time $t_2$, the A and B signals (reverse direction) intercept, and the $V_a$ signal changes state so that the V' signal is proposed to follow the falling portion of an A signal (for reverse direction). The proposed transition from A to B is shown by a dotted line. However, the switching process requires a finite switching time $\Delta t$ to complete. This poses a potential problem for recording the instantaneous amplitude of the signal V' for a start time $t_s$ or a finish time $t_f$ occurring during the switching interval, since the angular signal V' at such times is undefined. Furthermore, the start time $t_s$ and finish time $t_f$ pulses have finite widths. This presents a potential problem for recording the instantaneous amplitudes $V_1$ and $V_2$ if the switching process begins during the $t_s$ or $t_f$ pulse times. The structure of the time control unit 7 provides delay circuitry to avoid such problems. The time control unit 7 comprises four switching signal delay circuits which respectively receive inputs from the AND-gates 27, 28, 29 and the NOR-gate 32 of the control circuit 22. For clarity of presentation, only the delay circuit 50 which receives its input from the AND-gate 29 is shown in FIG. 5. The delay circuit 50 is of conventional type and may take the form, e.g. of a retriggerable one-shot multivibrator circuit. The input of circuit 50 is connected as an input to an AND-gate 51 and the inverting $\overline{Q}$ output is connected as an input to an AND-gate 52.

The time control unit 7 further comprises two additional time pulse input delay circuits which respectively receive start time $t_s$ and finish time $t_f$ pulses as inputs. Again, for clarity of presentation, only the delay circuit 53 connected to receive the $t_s$ pulse input is shown in FIG. 5. The delay circuit 53 is of the same type as the circuit 50 and is connected so that its noninverting Q output is connected as an input to the AND-gate 552 and its inverting $\overline{Q}$ output is connected as an input to the AND-gate 51. The AND-gate 51 is also connected to receive an input from the non-inverting $\overline{Q}$ output of the $t_f$ time pulse input delay circuit (not shown). The output of the AND-gate 51 is connected to a pulse former 54 which delivers the switching signal $V_u$ to the switch 36 of the switching network 5 and the memory 6. Each of the other three switching signal delay circuits (not shown) is connected in like manner to an AND-gate and a pulse former to deliver a switching pulse to the other switches 33, 34 and 35, respectively. The AND-gate 52 also receives inputs from the inverting $\overline{Q}$ outputs of the not shown switching signal delay circuits. The output $V_t$ of the AND-gate 52 serves as an input to a pulse former 55 which delivers the time interval start pulse to the memory 3, the correction circuit 4 and the timer 8. The $t_f$ time pulse input delay circuit is connected in like manner to an AND-gate and pulse former to deliver a time interval finish pulse to the same elements 3, 4 and 8.

With reference to the signal V' of FIG. 4B, at time $t_o$ the intersection of signals A and B is indicated by the state change of signal $V_a$ (FIG. 4A). This state change causes the AND-gate 29 to go high, which triggers the delay circuit 50 (output signal $V_u$) to block the transmission of time interval start pulses $t_s$ for a duration $\Delta t_u$. Thus, a start pulse $t_s$ actuating the delay circuit 53 during the switching interval $\Delta t_u$ is prevented from passing through the AND-gate 52 to the start time pulse former 55 until a time $t_1$ after the switching process is completed. In other words, a start pulse $t_s$ occurring during a switching of the network 5 is "stored" until the switching is completed. Hence, the actuation of the memory 3 and the timer 8 is delayed until after the undefined portion of the angular signal V'.

Similarly, a timing pulse ($t_s$ or $t_f$) delivered to one of the time pulse input delay circuits (circuit 53 shown for $t_s$; circuit for $t_f$ not shown) will trigger a timing pulse of duration $\Delta t_f$. The connection of the inverting outputs of these circuits to the AND-gate 51 serve to block the transmission of switching pulses through the AND-gate 51 and the pulse former 54 to the switch 36 for the duration of the timer pulse. In effect, the switching pulse is "stored" until the time start $t_s$ or time finish $t_f$ pulse has been processed. This is shown at time $t_2$ in FIG. 4B. The switching from signal $\overline{B}$ to signal A which would have occurred (as indicated by the dashed lines) is delayed until the time finish $t_f$ signal has been processed and the instantaneous value $V_2$ of V' at that time has been noted.

As seen in FIG. 4B, the shaft S comes to a temporary standstill at time $t=0$, as the direction of rotation is changed. After the change of direction, the angular signal V' follows the signal $\overline{B}$ (FIG. 2A), and an interval finish time $t_f$ pulse is given at time $t_2$. During the finish time $t_f$ pulse interval when the instantaneous value V' is being acquired for computation, the switch control circuit 22 indicates an intersection of the signals A and B. The AND-gate 51 (FIG. 5), however, delays the switching of the angular signal V' from signal $\overline{B}$ to signal A until after the instantaneous value $V_2$ is recorded.

As can be seen from FIG. 4B, the instantaneous values of the signal V' at times $t_1$ and $t_2$ are practically the same, i.e. $V_1=V_2$, so the correction factor is zero. Also, since no zero crossings of the signal V' occur during the measurement period T ($t_1$ to $t_2$), the counted number of zero crossings is $n=0$. Thus, at the output terminal 42 (FIG. 1) the value of the total angular displacement $\phi$ of the shaft is zero, and at the terminal 44 the value of the rotational speed determination is also zero.

Thus, as can be appreciated from the foregoing, the invention offers a device to more accurately determine rotational speed, even at low speeds and standstill. The device has the further advantage that it averages out to a large extent the adverse effects on speed determination due to temperature response and aging.

Having thus described the invention with particular reference to an example embodiment, it will be obvious to those skilled in the art to which the invention pertains, after understanding the invention, that various changes and modifications may be made therein without departing from the spirit and scope of the invention as defined by the claims appended hereto.

What is claimed is:

1. In an apparatus for determining the rotational speed of a rotating member having
    a digital tachometer signal generator which produces an angular signal that varies steadily at least section-wise and approximately periodically with the angle of rotation of the rotating member, the respective cycle length of said signal being defined by angular regions traversed by the rotating member between approximately equidistant discrete angular positions defined by the intersection of the angular signal with a reference value, and the instantaneous amplitude of said signal corresponding to the respective instantaneous angle of rotation relative to an adjacent one of the discrete angular positions, and which delivers a counting pulse whenever the instantaneous value of the angular signal is equal to the reference value; and
    a counter which counts the number of count pulses delivered within the measurement period for determining the number of said traversed angular regions, the improvement comprising:
    an output terminal on said signal generator for delivering the angular signal from the signal generator;
    a memory connected to the output terminal to receive and store until the end of the measurement period, in response to an initializing pulse, the amplitude of the angular signal corresponding to the instantaneous angle of rotation of the member at the beginning of the measurement period; and
    computation circuitry connected to receive, in response to an end pulse at the end of the measurement period, the amplitude of the angular signal corresponding to the instantaneous angle of rotation of the member at the end of the measurement period and the stored amplitude from the memory, to define a correction factor corresponding to the difference in the instantaneous angles of rotation at the beginning and end of the measurement period, and to compute a corrected total angular displacement based on the counted member of traversed angular regions and the defined correction factor.

2. Apparatus as defined in claim 1, wherein the digital tachometer signal generator produces at least two mutually phased-shifted signal curves; and further comprising a direction discriminator connected between the signal generator and the counter and cooperating with the counter so that upon reversal of the direction of rotation the angular regions traversed in reverse direction are counted with opposite sign.

3. Apparatus as defined by claim 1, wherein the digital tachometer signal generator produces four signals, phase-shifted relative to each other and all having sinusoidal, triangular or trapezoidal wave shapes; and further comprises a switch which serves to superpose the approximately linear sections of the signals to form a composite output angular signal having an approximately sawtooth wave shape.

4. Apparatus as defined by claim 3, further comprising a time control unit responsive to the receipt of start and stop electrical time pulses for fixing the length of the measurement time period, and for delivering the initializing and end pulses to other portions of the apparatus.

5. Apparatus as defined in claim 4, wherein the time control unit further comprises means for delaying the initializing or end pulse until switching is completed whenever such a pulse would otherwise be delivered during switching.

6. Apparatus as defined by claim 4, further comprising a timer driven by the initializing and the end pulses for determining the length of the measurement period; and the computation circuitry further comprising a divider connected to form the quotient of the corrected total angular displacement signal and the length of the measurement period determined by the timer.

7. Apparatus as defined in claim 6, further comprising a second memory responsive to actuation of the switch, to store the maximum amplitudes prior to each switching of the composite sawtooth-shaped signals; and wherein the computation circuitry further comprises means connected to the second memory to determine mean angular distance between discrete angular positions and means for normalizing the correction factor for the mean angular position.

8. Apparatus for determining the rotational speed of a rotating member, comprising a digital tachometer device having:
   (a) a signal generator for generating an electrical signal system consisting of at least two mutually phase shifted and steadily varying angular signals of approximately sinusiodal, triangular or trapeziodal wave shapes periodically in response to the rotation of the member through successive approximately equidistant discrete angular positions;
   (b) means for connection between said signal generator and a counter, said means for connection comprising a direction discriminator;
   (c) said counter, cooperating with the direction discriminator for counting the number of occurrences of a particular signal event within a specified time interval, to develop a digital determination of the rotational speed corresponding to the number of the discrete angular positions traversed during the time interval, so that upon reversal of the direction of rotation the particular signal events are counted with opposite sign;
   (d) an output terminal on said means for connection for delivering the angular signals from the signal generator to a switching means, said switching means superposing the approximately linear sections of the steadily varying signals to form a composite output angular signal having an approximately saw-tooth wave shape and a period length equal to the time distance between said particular signal events;
   (e) a memory connected to said switching means to receive and store until the end of the measurement period, in response to an initializing pulse, the instantaneous amplitude of the composite angular signal corresponding to the instantaneous angle of rotation of the member at the beginning of the measurement period; and
   (f) computation circuitry connected to receive, in response to an end pulse at the end of the measurement period, the instantaneous amplitude of the composite angular signal corresponding to the instantaneous angle of rotation of the member at the end of the measurement period and the stored amplitude from the memory, to define a correction factor corresponding to the difference in the instantaneous angles of rotation at the beginning and end of the measurement period, and to compute a corrected total angular displacement based on the counted member of tranversed angular regions and the defined correction factor.

9. Apparatus as defined by claim 1, wherein the electrical signal system generated by the digital tachometer device comprises a first angular signal and a 90°-phase shifted second angular signal and the composite angular signal is cyclically composed by a section of the first, the second, the inverted first and the inverted second angular signal.

* * * * *